(12) United States Patent
Ramarao et al.

(10) Patent No.: US 9,024,955 B2
(45) Date of Patent: May 5, 2015

(54) METHOD AND SYSTEM FOR DISPLAYING PROIRITIZED LIVE THUMBNAIL OF PROCESS GRAPHIC VIEWS

(75) Inventors: Surendra Channakeshavapura Ramarao, Bangalore (IN); Sanjeev Vahni Sarma, Mumbai (IN); Alagu Raja Pandian, Bangalore (IN)

(73) Assignee: Yokogawa Electric Corporation, Tokyo (JP)

( * ) Notice: Subject to any disclaimer, the term of this patent is extended or adjusted under 35 U.S.C. 154(b) by 308 days.

(21) Appl. No.: 13/638,229

(22) PCT Filed: Dec. 28, 2010

(86) PCT No.: PCT/IB2010/056088
§ 371 (c)(1),
(2), (4) Date: Sep. 28, 2012

(87) PCT Pub. No.: WO2011/128731
PCT Pub. Date: Oct. 20, 2011

(65) Prior Publication Data
US 2013/0021355 A1 Jan. 24, 2013

(30) Foreign Application Priority Data
Apr. 14, 2010 (IN) .......................... 1042/CHE/2010

(51) Int. Cl.
*G05B 23/02* (2006.01)
(52) U.S. Cl.
CPC .. *G05B 23/0272* (2013.01); *G05B 2219/24103* (2013.01); *G05B 2219/24123* (2013.01)
(58) Field of Classification Search
CPC ............. G05B 23/0267; G05B 23/027; G05B 23/0272
USPC .................................................. 345/520, 531
See application file for complete search history.

(56) References Cited

U.S. PATENT DOCUMENTS

| 8,601,402 B1* | 12/2013 | Habboub ...................... 715/863 |
| 2005/0012608 A1 | 1/2005 | Havekost et al. |
| 2006/0190584 A1 | 8/2006 | Skold et al. |

FOREIGN PATENT DOCUMENTS

| EP | 1811354 A1 | 7/2007 |
| EP | 1 965 301 A1 | 9/2008 |

(Continued)

OTHER PUBLICATIONS

Office Action dated May 27, 2014, issued in Corresponding Japanese Patent Application No. 2013-504352, with English Translation (9 pages).

(Continued)

*Primary Examiner* — Maurice L McDowell, Jr.
*Assistant Examiner* — Kyle Zhai
(74) *Attorney, Agent, or Firm* — Westerman, Hattori, Daniels & Adrian, LLP

(57) ABSTRACT

The system for displaying prioritized live thumbnail of process graphic views includes at least one real time data source 406 for providing live data information and at least one engineering information data source 409. Graphic File Monitor 401 is configured for monitoring change in graphic files repository 405 and Tag Extractor 407 is configured for extracting tags from graphic file for monitoring based on predefined rules. The system also includes Tag Monitor 402 for monitoring alarm status and/or data status changes of monitored tags and reading tag importance and alarm priority for monitored tags and View Ranker 408 for prioritizing the graphic views by ranking. Prioritized Thumbnail Presenter System 403 is used for displaying top most prioritized graphics that requires attention. Display system 404 is provided for displaying the prioritized live thumbnails and enlarged view of the process graphic views and update data into graphic objects displayed in graphic views.

15 Claims, 10 Drawing Sheets

(56) References Cited

FOREIGN PATENT DOCUMENTS

| | | |
|---|---|---|
| JP | 04-006415 A | 1/1992 |
| JP | 04-253093 A | 9/1992 |
| JP | 06-103476 A | 4/1994 |
| JP | 07-234718 A | 9/1995 |
| JP | 09-305220 A | 11/1997 |
| JP | 2006-163468 A | 6/2006 |
| JP | 2007-193419 A | 8/2007 |
| JP | 2008-287360 A | 11/2008 |
| JP | 2009-146208 A | 7/2009 |
| JP | 2009-282870 A | 12/2009 |
| JP | 2010-128714 A | 6/2010 |
| JP | 2011-154429 A | 8/2011 |
| WO | 2009/085534 A1 | 7/2009 |

OTHER PUBLICATIONS

International Search Report for PCT/IB2010/056088, mailing date of May 2, 2011.

\* cited by examiner

| GR0001 | | Alarm Priority | | | | | | | | Rank |
|---|---|---|---|---|---|---|---|---|---|---|
| | | High | Medium | Low | | Computed Score | | | Total Score | 2 |
| Tag Importance | Important | 1 | 0 | 0 | | 25 | 0 | 0 | | |
| | General | 1 | 1 | 0 | | 15 | 9 | 0 | | 50 |
| | Auxilary | 0 | 0 | 1 | | 0 | 0 | 1 | | |
| | | | | | | | | | | |
| GR0002 | | Alarm Priority | | | | | | | | |
| | | High | Medium | Low | | Computed Score | | | Total Score | 1 |
| Tag Importance | Important | 1 | 0 | 0 | | 25 | 0 | 0 | | |
| | General | 1 | 2 | 0 | | 15 | 18 | 0 | | 63 |
| | Auxilary | 1 | 0 | 0 | | 5 | 0 | 0 | | |
| | | | | | | | | | | |
| GR0003 | | Alarm Priority | | | | | | | | |
| | | High | Medium | Low | | Computed Score | | | Total Score | 3 |
| Tag Importance | Important | 0 | 0 | 1 | | 0 | 0 | 5 | | |
| | General | 0 | 1 | 0 | | 0 | 9 | 0 | | 23 |
| | Auxilary | 1 | 0 | 4 | | 5 | 0 | 4 | | |

METHOD AND SYSTEM FOR DISPLAYING PROIRITIZED LIVE THUMBNAIL OF PROCESS GRAPHIC VIEWS

TECHNICAL FIELD

The present disclosure relates generally to Industrial Automation systems utilized for measuring and monitoring plant performance and operations. More particularly, the disclosure relates to a method and system for displaying prioritized live thumbnail of process graphic views that require operator attention.

BACKGROUND

Industrial automation systems, typically consists of input and output modules, controllers (Field Control Station), HMIs (Human-Machine Interface) and a control network used for communication. Typically it also contains one or more engineering stations, used for configuring the whole system including HMIs and FCS.

The Field Control Station (FCS) is a device that performs process control. It consists of various types of function blocks that execute control calculations and the input/output functions such as the process input/output and the software input/output.

Existing system and method or function block performs input processing, calculation processing, and output processing in sequence for an input signal read from the input terminal, and writes an output signal from the output terminal. It also performs alarm processing when abnormality is detected in input, calculation or output. Each function block that is configured to be used in an FCS has an associated tag name.

Any abnormality in plant is known as Alarm. Alarms can be of two types such as Process Alarm and System Alarm.

Process Alarms originates from FCS. FCS detects any abnormalities in the process from values such as the process variable (PV) and manipulated output value (MV), then reflects this in the function block alarm status while at the same time consolidating the detection results and giving notification of these to the HMI (operation and monitoring function) as a message. Alarm processing is found in each function block.

The alarm generated from a function block can have different status such as input open (IOP+, IOP−), Input Error (BAD), Input High or Low (HH, HI, LO, LL), Input Velocity (VEL+, VEL−), Deviation Alarm (DV+, DV−), Output Open (OOP), output High and output low (MHI, MHL), Bad Connection (CNF).

The system alarm notifies operator of the abnormalities in the hardware and communication errors.

The alarm processing level can be designated for each Tag (function Block). The alarms originating from the function block will have the designated priority (High, Medium or Low). Importance level for each Tag (function block) can be specified. For e.g. Important, General or Auxiliary.

The HMI system used in Industrial Automation usually presents the information to the operating personnel graphically, in the form of graphic pages (also called as process graphics, graphic views or mimic diagram). This means that the operator can see a schematic representation of the plant being controlled. For example, a picture of a pump connected to a pipe can show the operator that the pump is running and how much fluid it is pumping through the pipe at the moment. The operator can then switch the pump off. The HMI system will show the flow rate of the fluid in the pipe in real time.

7
Graphic pages may consist of line graphics and schematic symbols to represent process elements, or may consist of digital photographs of the process equipment overlain with animated symbols. These elements of a graphic page are generally referred to graphic objects. Graphic objects can be configured to show the process value by associating them with corresponding process tags. They can also be configured to show alarm status of associated tags. Above content is based on existing knowledge.

The Overview Graphics is a special type of Graphic that is used to display the status of the function blocks. It can be configured so that operator can call related operation and monitoring windows based on function block status. The overall status of the plant can be grasped at a glance.

Design Time Configuration for Overview Graphic

The overview object, which is one of the constituent elements of a graphic, has functions such as process status list display, alarm status acknowledgment operation, and calling related windows. Various attributes such as name, type and display method can be set for the overview object. By organizing the windows hierarchically using this overview objects, alarm status and other information in the lower window can be consolidated in the upper Graphic window and monitored. Therefore, the alarm status of the entire plant can be grasped at a glance in the uppermost Graphic window. Alarm status monitoring using overview graphic is illustrated in FIG. 1. Also, FIG. 1 illustrates hierarchy of organization of windows. Further, refer to FIG. 2 for flow chart of design time configuration.

Run Time Behavior of Overview Graphic

The Overview graphic with configured push buttons when opened displays the buttons with the actual state. The button blinks and notifies when alarm is generated on the configured graphic. When the user clicks on the button it opens the configured graphic. The FIG. 1 shows an example. FIG. 3 shows an exemplary flow chart illustrating Run time behavior of overview graphic.

Above content is based on existing knowledge.

Some of the Disadvantages of Current Practice/Solutions

1. Operators while monitoring and controlling a plant need to keep tab on various graphics to know the live status. However it is humanly impossible to focus on multiple graphics at the same time.
2. User needs to configure the Overview graphic to monitor each important graphic view.
3. Currently overview object doesn't consider tag importance or alarm priority; user is notified on all types of alarms.

SUMMARY OF THE DISCLOSURE

The shortcomings of the prior art are overcome and additional advantages are provided through the provision of a method as claimed in claim 14, and corresponding system as claimed in claim 1.

Additional features and advantages are realized through the techniques of the present disclosure. Other embodiments and aspects of the disclosure are described in detail herein and are considered a part of the claimed disclosure.

It is an object of the present disclosure to provide a system that automatically identifies and displays the live thumbnail of important graphic views, which need attention of the operator.

Second object of the present disclosure is to resolve the issues associated with the abnormal situation in the plant, wherein the graphic will be automatically removed or demoted to lower priority when such an abnormal situation is being attended to or has been resolved.

Third object of the present disclosure is to improve the productivity of the operator and avoid the engineering effort required in creating overview graphic.

An exemplary embodiment provides a system for displaying prioritized live thumbnail of process graphic views, said system comprises at least one real time data source 406 for providing live data information; at least one graphic files repository 405 containing graphic files that are configured for monitoring and controlling plant performance and operation; at least one engineering information data source 409 for providing engineering information about process tags and graphics; graphic file monitor 401 being configured for monitoring addition, deletion or change in graphic files repository 405 and tag extractor 407 being configured for extracting tags from the parsed graphic files based on predefined rules for monitoring; tag monitor 402 being configured for monitoring the real time data source 406 for alarm status and/or data status changes of monitored tags and reading tag importance and alarm priority for monitored tags from engineering information data source 409, and View Ranker 408 for prioritizing the graphic views by ranking based on predefined rules and relative attention required by an operator; prioritized thumbnail presenter system 403 for automatically displaying top most prioritized graphics that requires attention; and display system 404 for displaying pre-configured views of the prioritized live thumbnail of the process graphic views; display system 404 being also configured to retrieve the real time data from the data source 406 periodically and update data into graphic objects displayed in graphic views.

In an exemplary embodiment, the real time data source 406 is either a system controller or a simulator or a database.

In an exemplary embodiment, the engineering information data source 409 is either a file or a database.

In an exemplary embodiment, the Graphic File Monitor 401 monitors the graphic files on the station for any addition or deletion or modification of the graphic files.

In an exemplary embodiment, the Tag Monitor 402 maintains association map between the tags and the graphic view.

In an exemplary embodiment, the View Ranker 408 ranks the graphic views based on the tag importance, the alarm priority, alarm status and customized rules or customized rules setup by a user.

In an exemplary embodiment, the Prioritized Graphic Thumbnail Presenter System 403 is capable of periodically querying the Tag Monitor 402 and the View Ranker 408 for the top most graphic views to be displayed.

In an exemplary embodiment, the Prioritized Graphic Thumbnail Presenter System 403 subscribes for notification of change in ranking from the Tag Monitor 402 and the View Ranker 408.

In an exemplary embodiment, the top most prioritized graphic in the thumbnail is highlighted with a border to draw attention of the operator.

In an exemplary embodiment, Prioritized Graphic Thumbnail Presenter system 403 displays the configured number of prioritized live thumbnails to the operator.

In an exemplary embodiment, the system provides snapshot image of the graphic and displays live view whenever user decides to zoom on particular graphic of his interest.

In an exemplary embodiment, the views are displayed either in miniature live thumbnail form or in full view.

In the exemplary embodiment, the operator is shown a list of prioritized graphic views instead of their live thumbnails.

Another exemplary embodiment provides a method of displaying prioritized live thumbnail of process graphic views comprises act of monitoring addition, deletion or change in at least one graphic files repository 405; extracting tags from the parsed graphic files for monitoring based on predefined rules; monitoring at least one real time data source 406 for alarm status and/or data status changes of monitored tags; reading tag importance and alarm priority for monitored tags from engineering information data source 409, and thereafter prioritizing the graphic views by preparing ranking table by Tag Monitor 402 and View Ranker 408; identifying automatically most prioritized live thumbnail of graphic views based on ranking inputs received from the Tag Monitor 402 and the View Ranker 408 and highlighting the thumbnail that require operator attention; and displaying the most prioritized live thumbnail of the graphic views in pre-configured views and retrieve the real time data from the data source 406 periodically and update data into graphic objects displayed in graphic views.

In an exemplary embodiment, the extracting of tags is based on built-in rules and customized rules.

In an exemplary embodiment, the built-in rules are selected from a group comprising (a) if the graphic file contain graphic objects that is configured for alarm-triggered blinking, then associated process tags are extracted for monitoring; (b) if the graphic file contain instrument faceplates graphic objects, then associated tags are extracted for monitoring; and combination thereof.

In an exemplary embodiment, the customized rules are selected from a group comprising (a) if the tags start with characters A1 then extract them; (b) if the tag starts with characters B1 do not extract them; (c) extract all tags from the graphic files starting with character IMP; and combination thereof.

In an exemplary embodiment, the views are displayed either in miniature live thumbnail form or in full view.

In an exemplary embodiment, the operator previews the enlarged graphic by doing mouse over on graphic of his interest.

In an exemplary embodiment, the graphic will be automatically removed or demoted to lower priority after resolving the issues associated with abnormal situation.

Yet another exemplary embodiment provides a computer program for displaying prioritized live thumbnail of process graphic views, said computer program code comprising code segment for monitoring addition, deletion or change in at least one graphic files repository 405; code segment for extracting tags from the parsed graphic files for monitoring based on predefined rules; code segment for monitoring at least one real time data source 406 for alarm status and/or data status changes of monitored tags; code segment for reading tag importance and alarm priority for monitored tags from engineering information data source 409, and thereafter prioritizing the graphic views by preparing ranking table by Tag Monitor 402 and View Ranker 408; code segment for identifying automatically most prioritized live thumbnail of graphic views based on ranking inputs received from the Tag Monitor 402 and the View Ranker 408, and highlighting the thumbnail that require operator attention; and code segment for displaying the most prioritized live thumbnail of the graphic views in pre-configured views; and code segment for retrieving the real time data from the data source 406 periodically and code segment to update data into graphic objects displayed in graphic views.

Still another exemplary embodiment provides a computer readable medium including operations stored thereon that when processed by at least one processors cause a system to perform the acts act of monitoring addition, deletion or change in at least one graphic files repository 405; extracting tags from the parsed graphic file for monitoring based on predefined rules; for monitoring at least one real time data source 406 for alarm status and/or data status changes of monitored tags; reading tag importance and alarm priority for monitored tag from engineering information data source 409, and thereafter prioritizing the graphic views by preparing ranking table by Tag Monitor 402 and View Ranker 408; identifying automatically most prioritized live thumbnail of graphic views based on ranking inputs received from the Tag Monitor 402 and the View Ranker 408 and highlighting the thumbnail that require operator attention; and displaying the most prioritized live thumbnail of the graphic views in pre-configured views and retrieving real time data from data source 406 periodically and updating data into graphic objects displayed in graphic views.

The foregoing summary is illustrative only and is not intended to be in any way limiting. As will become apparent to those skilled in the art, numerous other embodiments, features and further aspects of the instant disclosure will become evident hereinafter from the following descriptions and claims.

BRIEF DESCRIPTION OF THE ACCOMPANYING DRAWINGS

The drawings illustrate both the design and utility of the preferred embodiments of the present disclosure, wherein.

The figures depict embodiments of the disclosure for purposes of illustration only. One skilled in the art will readily recognize from the following description that alternative embodiments of the structures, modules and methods illustrated herein may be employed without departing from the principles of the disclosure described herein.

DETAILED DESCRIPTION

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

Figure 1:
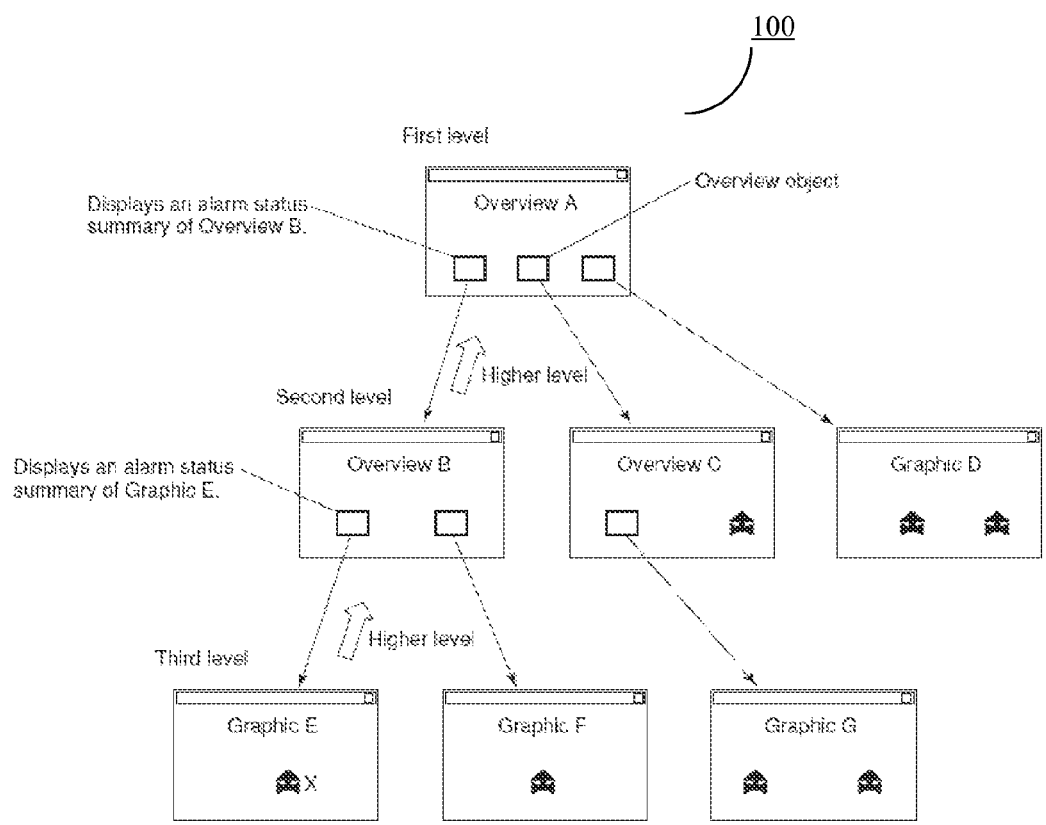
FIG. 1 (prior art) is an illustrative system which diagrammatically shows alarm status monitoring using overview graphic and shows hierarchy of organization of windows.
Figure 2:
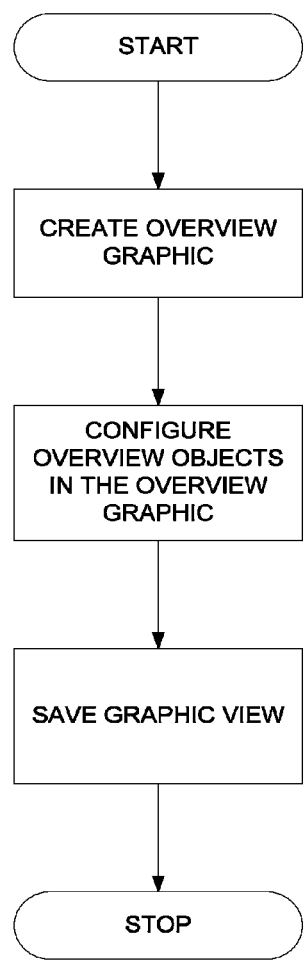
FIG. 2 (prior art) is a flow chart illustrating an exemplary methodology of overview design configuration.
Figure 3:
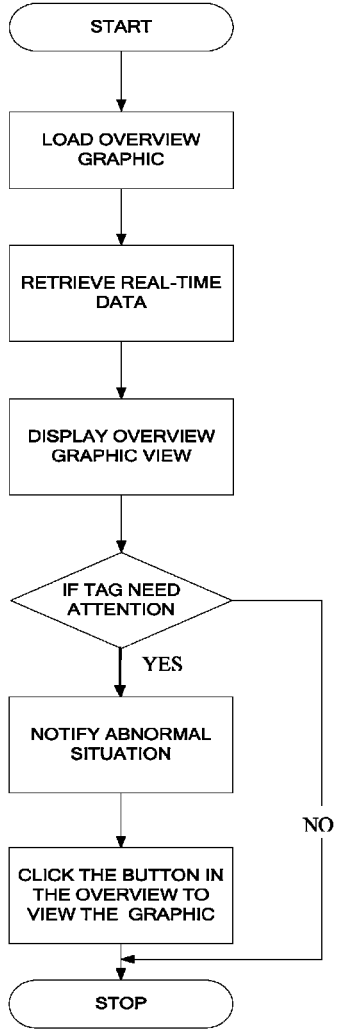
FIG. 3 (prior art) is a flow chart illustrating an exemplary methodology of run time behavior of overview graphic.
Figure 4:
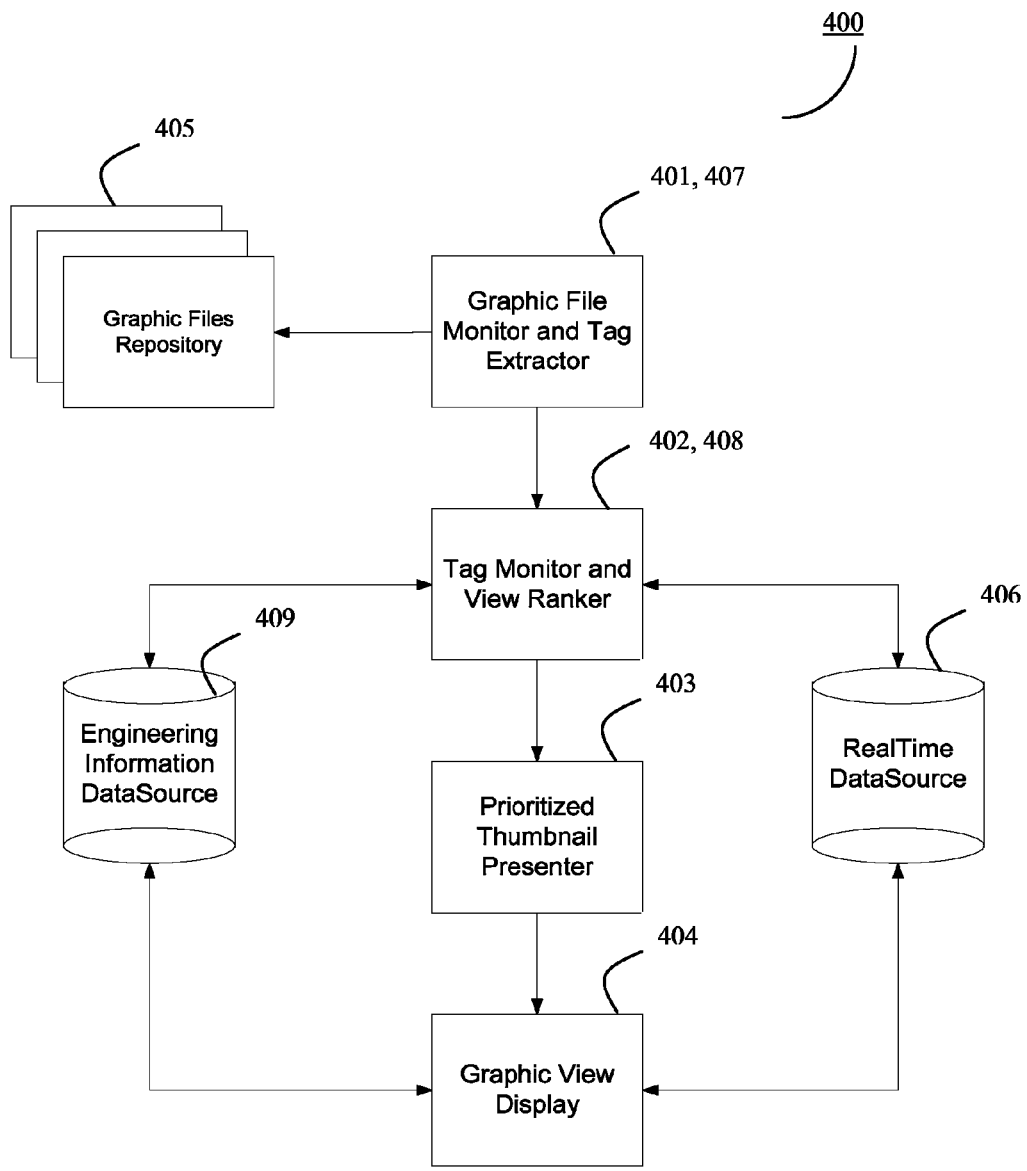
FIG. 4 is an exemplary block diagram for prioritized live thumbnail of process graphic views.
Figure 11:
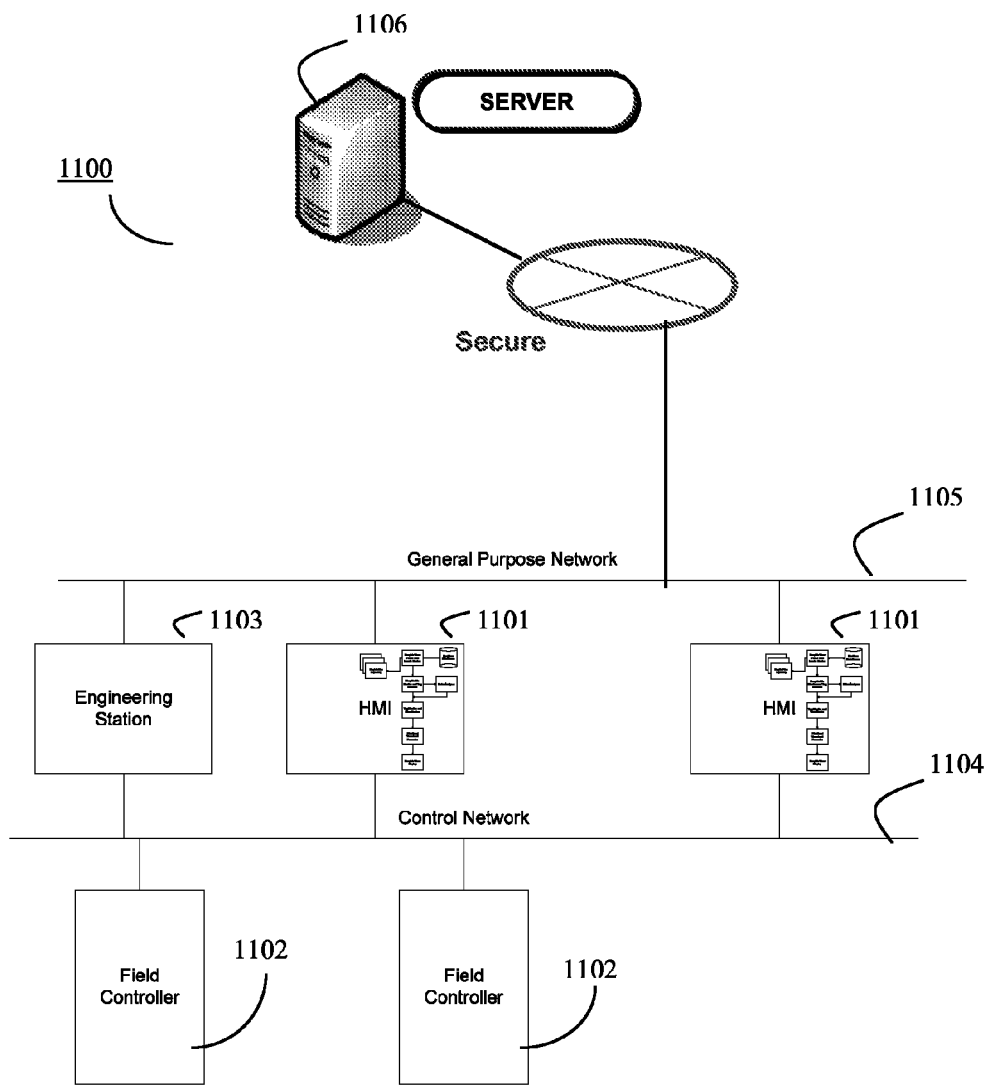
FIG. 11 is an illustrative system which diagrammatically shows system configuration wherein filed controllers and HMIs are interconnected through control network.

Referring now to FIG. 4, various modules of system 400 in accordance with an aspect of the subject disclosure for displaying prioritized live thumbnail of process graphic views that require operator attention is illustrated. The various modules disclosed in the present disclosure are interrelated and are installed on each HMI. An exemplary system configuration is illustrated in FIG. 11. In the illustrated embodiment, exemplary system 1100 comprises of Field controllers 1102, Human Interface/Engineering Stations 1101 and 1103, computing device 1106 may comprise a server computer or the like and general purpose network 1105 and dedicated control network 1104. The network(s) 1104 and 1105 may comprise a public network e.g., the Internet, World Wide Web, etc. or private network e.g., local area network (LAN), etc. or combinations thereof e.g., a virtual private network, LAN connected to the Internet, etc. Furthermore, the network(s) (1105 and 1104) need not be a wired network only, and may comprise wireless network elements as known in the art. The system (1100) may work on distributed computing environment in which some of the modules for example but not limiting to Graphic File Monitor 401 and Tag extractor 407 and Tag Monitor 402 and View Ranker 408 as referred in FIG. 4 is embedded with server machine and rest of the modules for example but not limiting to Prioritized Graphic Thumbnail Presenter System 403, Graphic View Display System 404 are loaded on individual client HMI machines. Now, functionality and working of each module are explained in detail herein below.

Graphic File Repository 405 is configured to store plurality of graphic files. The stored graphic files are configured for monitoring and controlling the plant.

Real time data source 406 is used to provide access to live process data. The data source 406 includes but not limiting to any system controller or simulator or database. The data source 406 is the responsible for providing real time data to tag monitor module 402 and graphic view display module 405. The real time data comprises for example but not limiting to process value data associated with process tags, alarm status data associated with process tags, process tag mode information.

Engineering information data source 409 is used to access engineering data. The data source 409 includes but not limiting to a file or a database. The data source 409 is responsible for providing engineering data to tag monitor module 402 and graphic view display module 405. The engineering data comprises for example but not limiting to process tag priority, alarm priority, high limit and low limit information and tag description.

Graphic File Monitor 401 and Tag Extractor 407 module monitors the graphic files on the station for any addition or deletion or modification or combinations thereof. This module 401 extracts the tags that need to be monitored. The extracted tags are passed to Tag Monitor 402 as information for further processing. The tags are extracted based on some rules. The rules are broadly classified into built-in rule and customized rule. The exemplary rules are explained below:

I. Exemplary built-in rules for extracting tags can be as follows. However these rules should not be construed to limit the scope of the disclosure:—

If the graphic file contains graphic objects that have been configured for alarm-triggered blinking, then the associated process tags will be extracted for monitoring.

If the graphic file contains instrument faceplates graphic objects, then the associated tags will be extracted for monitoring.

II. User can define their own rules or edit the rules according to their specific needs. The administrator or station operator can create their own rules for extracting the tags. Exemplary custom rules for extracting tags can be as follows. However these rules should not be construed to limit the scope of the disclosure:—

If the tags start with characters A1 extract them

If the tags start with character B1 do not extract them.

Extract all tags from graphic files starting with character IMP.

Figures 5, 6:
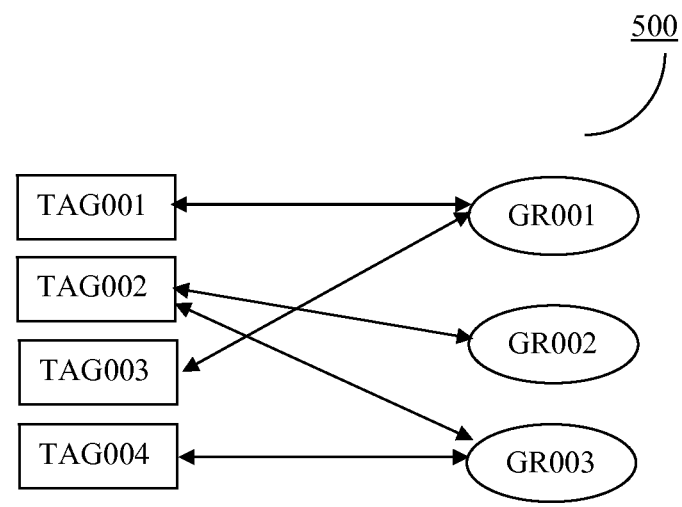
FIG. 5 shows an exemplary pictorial representation of the association map between Tag and Graphics.
FIG. 6 shows schematic diagram that illustrates an exemplary ranking table prepared for Tag importance and Alarm priority.

Tag Monitor 402/View Ranker 408 module monitors that tags alarm status for example abnormal situation and/or for specified state changes. It also maintains association map between tags and graphic view. For the association map, it is possible to understand all the graphic pages which contain a particular tag. Alternatively using this association map, user can know all the monitored tags that are contained in a particular graphic. The exemplary pictorial representation of the association map 500 is illustrated in FIG. 5 in accordance with the instant subject disclosure.

Figure 10:
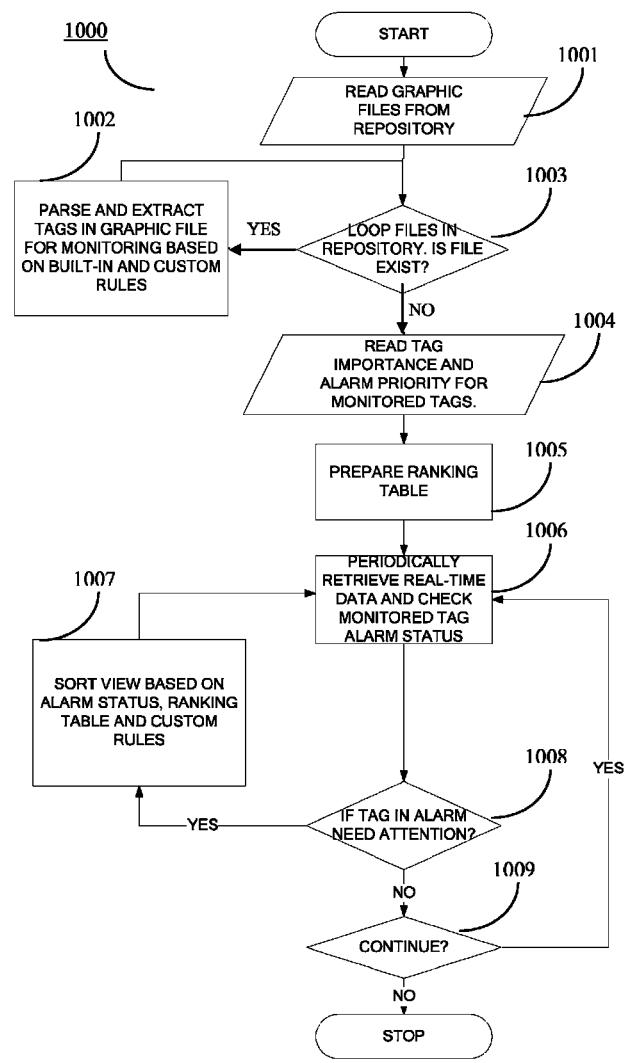
FIG. 10 is a flow chart illustrating an exemplary methodology of ranking and prioritizing the live thumbnail of process graphic view in accordance with an aspect of the subject disclosure.

The module 402 ranks the graphic views based on predetermined information includes but not limiting to tag importance, alarm priority, alarm status and/or based on rules set up by the user. The ranked graphic views help in attracting the attention of the operator in case of abnormality. Different methodology can be used for ranking the graphic views. Below is one example of such ranking used in the present disclosure and it should not be construed to limit the scope of the disclosure. FIG. 10 illustrates an exemplary methodology 1000 of ranking and prioritizing the live thumbnail of process graphic view in accordance with an aspect of the subject disclosure.

Ranking methodology begins with preparing ranking table for tag importance and alarm priority. An exemplary ranking table 600 is illustrated in FIG. 6. The row of the table specifies tag importance. The importance is further classified into multiple levels for example important, general and auxiliary based on importance of the tag in the process. In the same way column of the table is classified into various levels of alarm priority. For example alarm priority could be high or low or intermediate such as medium based on criteria such as safety, environment, and commercial importance.

Figure 7:
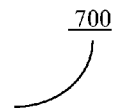
FIG. 7 shows schematic diagram that illustrates an exemplary methodology of score computation and graphic ranking Graphic with highest score is assigned highest priority.

After creating table, for each graphic, number of tags in each alarm priority level is checked. Further, score is computed by multiplying it with corresponding cell in the ranking table. Total score is computed by adding all the computed scores. Once, total score is computed, it is easy to identify highest ranked graphic. The graphic with highest score will be qualified as highest rank. Exemplary methodology of score computation and graphic ranking 700 is illustrated in FIG. 7. When the score for two graphics is same, then priority can be decided based on number of important tag in a graphic or on the basis of timing of particular alarm. It is also possible to compute the score by considering other factors such as alarm status. For example, HH alarm status can be given more weight compared to a HL alarm.

User can customize the ranking system by deciding on weights for different parameters and by adding additional filtering rules for tags and alarms. Additionally, user can also add rules for monitor module to consider state or value changes in tags for the purpose of ranking a graphic. For example, user can specify a rule that if value of TagName.PV is greater than 50, then it will require operator attention. Apart from user specified rules and filters, monitoring module can interface with other applications for example but not limiting to Alarm Rationalization programs to decide which alarms need to be considered and which needs to be ignored.

This module 402 provides to the user for querying for graphic ranking or requesting to notify the changes in ranking. An exemplary methodology 1000 of ranking and prioritizing the live thumbnail of process graphic view in accordance with an aspect of the subject disclosure is illustrated in FIG. 10.

Referring now to FIG. 10, processing of information collected from Real time Data Source 406 for ranking and prioritizing the live thumbnail of process graphic view in accordance with one embodiment is described in further detail. In one embodiment, the processing illustrated in FIG. 10 is implemented using stored instructions executed by one or more suitable processing modules, as described above. However, it is understood that other hardware or combined hardware/software implementation techniques may be equally employed as a matter of design choice. Regardless of that, processing begins at block 1001 where graphic files are retrieved from the graphic file repository 405. At block 1003 the repository 405 will be continuously looped to find out whether files are still exist in the repository 405. If files still exist, then the files are parsed and tags are extracted from graphic file for monitoring based on built-in and custom rules. This step is illustrated at block 1002 in FIG. 10. Once, tags are extracted for monitoring in block 1002, tag importance and alarm priority for monitored tag is examined at block 1004 by accessing required data from Engineering Information data source 409. Further at block 1005 ranking table is prepared using the information such as tag importance and alarm priority examined at previous block 1004. After ranking table is generated at block 1005, the real time data is periodically retrieved from real time data source 406 and also monitored tags are periodically checked for alarm status at block 1006. At block 1008 tag in alarm is checked whether it requires attention or not. If attention is required then automatically views are sorted based on Alarm status, ranking table and custom rules. After this step, control is returned to block 1006 and same steps are repeated. If the attention is not required then the control is returned to block 1006 and same steps are repeated.

Prioritized Graphic Thumbnail Presenter System 403 module is responsible for displaying the thumbnails (pre-configured number of thumbnails) of graphics that need attention. According to configuration this module 403 can periodically query the Tag Monitor 402 and View Ranker 408 for top graphic views to be displayed.

Figure 8:
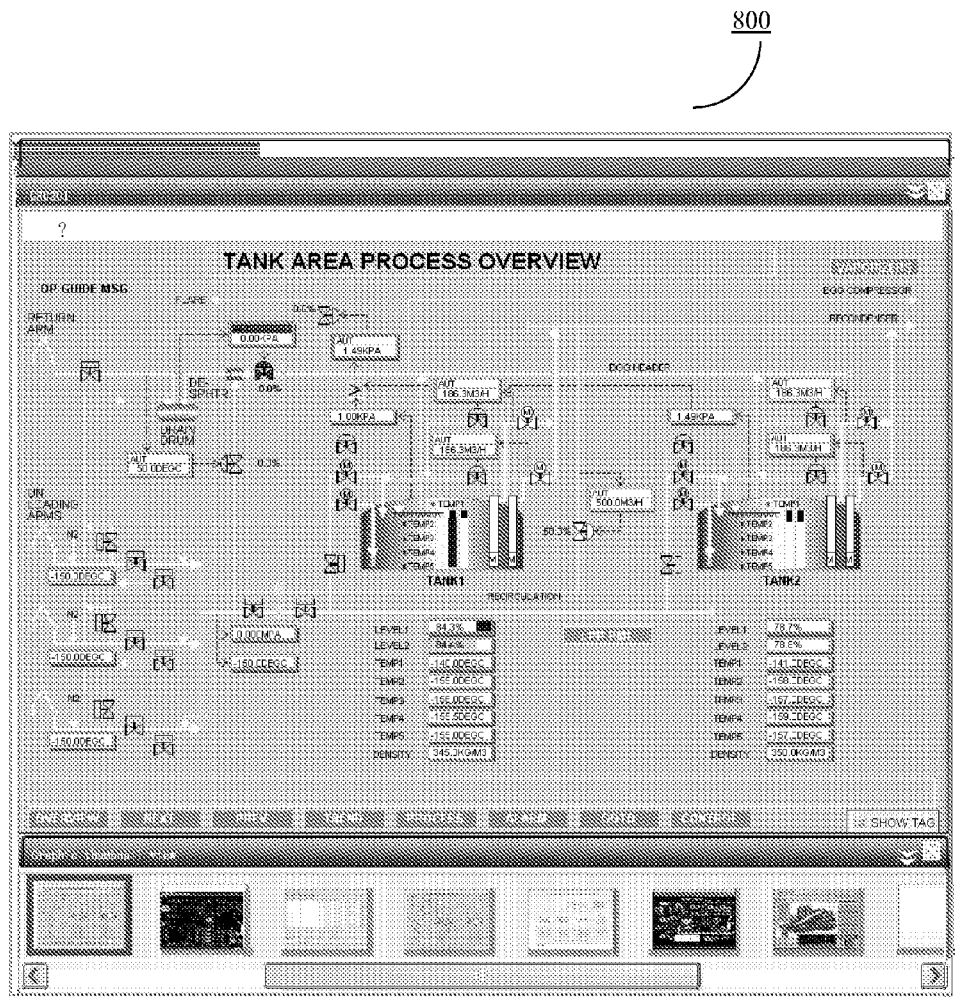
FIG. 8 is a screen capture of an exemplary user interface showing highlighted prioritized live thumbnail of process graphic view in accordance with an aspect of the subject disclosure.
Figure 9:
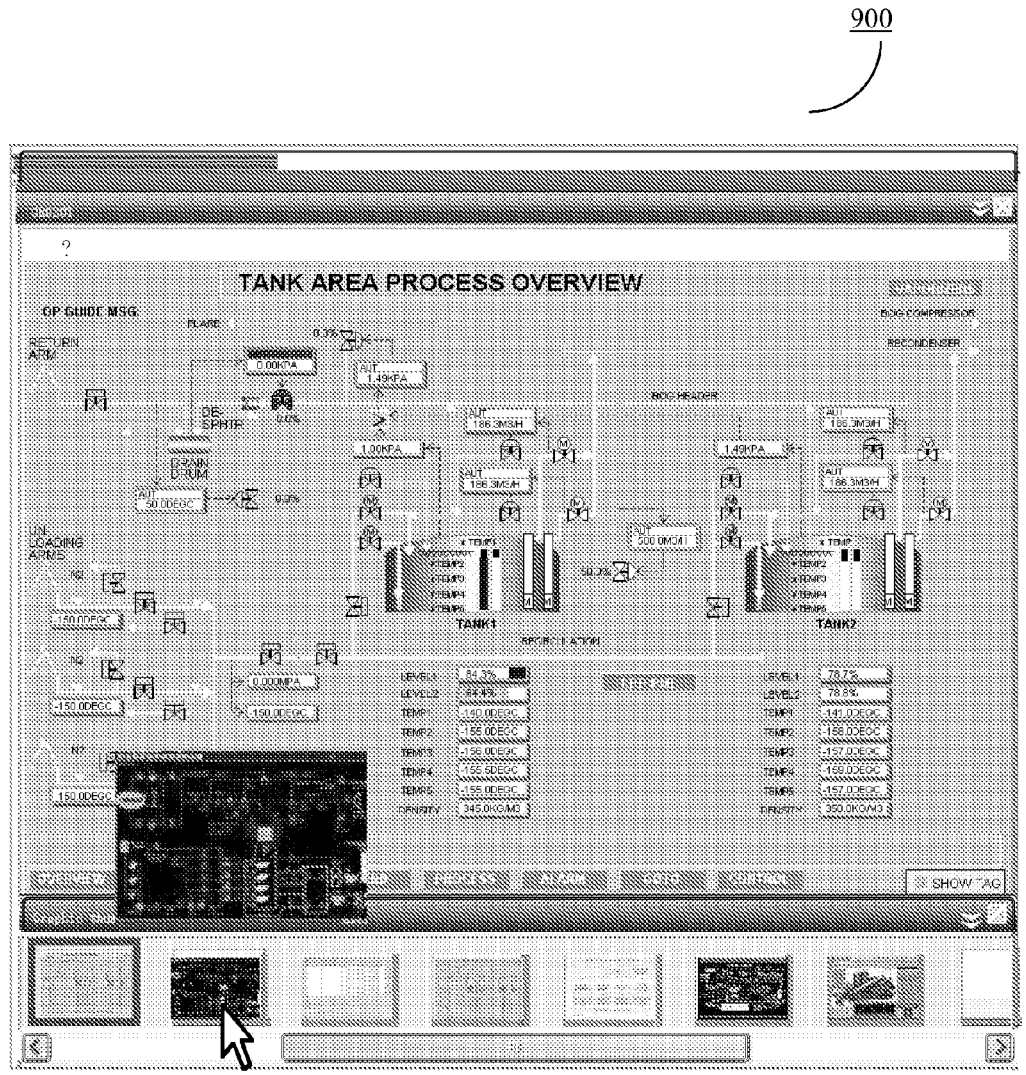
FIG. 9 is a screen capture of an exemplary user interface showing zoomed prioritized live thumbnail of process graphic view in accordance with an aspect of the subject disclosure.

Alternatively this module 403 can subscribe for ranking change notification from the Tag Monitor 402 and View Ranker 408. In either case, after obtaining the top rank graphics, the thumbnail view will be updated to host and present the miniature live graphics of those views. Attention of the operator will be drawn to top ranking graphic for example but not limiting to by highlighting it with a border. Other means of drawing attention includes but not limiting to use of different border colors for different priority, pop-up messages etc. FIG. 8 shows a screen capture 800 of an exemplary user interface showing highlighted prioritized live thumbnail of process graphic view in accordance with an aspect of the subject disclosure. Operator can preview the slightly enlarged graphic by mouse over on the graphic of his interest. However, zoom factor for mouse over can be pre-configured. Now, Operator can select a particular graphic and it will be automatically maximized for monitoring and control operation. This is illustrated in FIG. 9 which shows a screen capture of an exemplary user interface 900 showing zoomed prioritized live thumbnail of process graphic view in accordance with an aspect of the subject disclosure.

In case the operator station hardware configuration is not suitable for supporting many live graphic thumbnails, only the snapshot image of the graphic will shown and live graphic will be only shown when the user decides to zoom on a particular graphic of his interest. Option will be provided to suppress or remove certain views if the operator feels that it is not of particular interest.

Graphic View Display module 404 displays the selected views either in miniature live thumbnail form or in the full view. It also retrieves the required engineering information and real time process data from the data sources 409 and 406 and updates graphic objects that are part of graphic view.

Aspects of the present disclosure are suitable for use in a variety of distributed computing system environments. In distributed computing environments, tasks may be performed by remote computer devices that are linked through communications networks. Embodiments of the present disclosure may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, network PCS, minicomputers, mainframe computers, and the like.

The invention will be described in the general context of computer-executable instructions, such as program modules, that are executed by a personal computer or a server. Generally, program modules include routines, programs, objects, components, data structures, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Alternately, portions of the framework may be implemented in hardware or a combination of hardware, software, and/or firmware. For example, one or more application specific integrated circuits (ASICs) or programmable logic devices (PLDs) could be designed or programmed to implement one or more portions of the framework.

We claim:

1. An automation system for management and process control in a plant, comprising:
   a field controller providing the process control using function blocks identified by tags;
   a real time data source providing live data information;
   a graphic files repository storing graphic files that are configured for monitoring and controlling operations in the plant;
   an engineering information data source providing engineering information including tag importance levels and alarm priority levels about process tags used by the field controller;
   a server computer configured with:
      a graphic file monitor that monitors addition, deletion, or change in the graphics files stored in the graphic files repository;
      a tag extractor that extracts tags identifying function blocks from the graphic files from the graphics files repository based on predefined rules for monitoring;
      a tag monitor that monitors alarm status and data status changes of the tags extracted by the tag extractor for monitoring and reading an importance of the monitored tags and an alarm priority for the monitored tags; and
      a view ranker that prioritizes graphic views used in the graphic files for the monitored tags by ranking each of the graphic views based on a total score determined from values for the tags related to each graphic view mapped in a graphic ranking table mapping different tag importance levels with different alarm priority levels corresponding to each of the tags related to each graphic view; and
   a Human-Machine Interface (HMI) machine generating and displaying graphics pages as an interface to control and monitor operations in the plant, the HMI machine communicating with the field controller and the server computer, and the HMI machine being configured with:
      a prioritized thumbnail presenter system that automatically displays thumbnails of the graphic views prioritized by the view ranker, with the thumbnail of the highest scoring graphic view highlighted with a border to draw attention of the operator; and
      a display system displaying pre-configured views of the thumbnails of the graphic views prioritized by the view ranker and updating the pre-configured views of the thumbnails of the graphic views prioritized by the view ranker with real time data.

2. The system as claimed in claim 1, wherein the real time data source (406) is one of a system controller or a simulator or a database.

3. The system as claimed in claim 1, wherein the engineering information data source is either a file or a database.

4. The system as claimed in claim 1, wherein the tag monitor maintains an association map between the monitored tags and the graphic view.

5. The system as claimed in claim 1, wherein the view ranker in the server computer further prioritizes the graphics views by ranking using alarm status and customized rules.

6. The system as claimed in claim 1, wherein the prioritized graphic thumbnail presenter system periodically queries the tag monitor and the view ranker for the prioritized graphic views to be displayed.

7. The system as claimed in claim 1, wherein the prioritized graphic thumbnail presenter system subscribes for notification of change in ranking for the prioritized graphic views from the tag monitor and the view ranker.

8. The system as claimed in claim 1, wherein the HMI machine provides a snapshot image of one of the graphic views selected for zoom from the displayed views of the thumbnails of the graphic views prioritized by the view ranker.

9. The system as claimed in claim 1, wherein the displayed views of the thumbnails of the graphic views prioritized by the view ranker are displayed either in miniature live thumbnail format or in full view format.

10. A method of management and process control in a plant including a field controller providing process control using function blocks identified by tags, a server computer, and a Human-Machine Interface (HMI) machine communicating with each other, said method comprising the steps of:
monitoring, by the server computer, addition, deletion or change in at least one of a plurality of graphic files stored in a graphic files repository;
extracting, by the server computer, monitored tags identifying function blocks from the graphic files from the graphic files repository based on predefined rules for monitoring;
monitoring, by the server computer, at least one real time data source for alarm status and data status changes relating to the monitored tags;
reading, by the server computer, tag importance information and alarm priority information for the monitored tags from engineering information data source
prioritizing, by the server computer, graphic views used in the graphic files for the monitored tags by ranking each of the graphic views based on a total score determined from values for the tags related to each graphic view mapped in a graphic ranking table mapping different tag importance levels with different alarm priority levels corresponding to each of the tags related to each graphic views;
automatically identifying and displaying, by the HMI machine, pre-configured views of prioritized live thumbnails of the prioritized graphic views;
updating the pre-configured views of the thumbnails of the prioritized graphic views with real time data.

11. The method as claimed in claim 10, wherein the extracting of the monitored tags is based on built-in rules and customized rules.

12. The method as claimed in claim 10, wherein the graphic views are displayed either in miniature live thumbnail format or in full view format.

13. The method as claimed in claim 10, wherein an enlarged view is generated for one of the graphic views having a mouse positioned over the one of the graphic views.

14. The method as claimed in claim 10, wherein the ranking of one of the prioritized graphic views will be automatically adjusted by removing the one of the prioritized graphic views or demoting the ranking of the one of the prioritized graphic views to lower priority.

15. A non-transitory computer readable medium including operations stored thereon that when processed by at least one processor cause a system to perform the steps of:
monitoring addition, deletion or change in at least one of a plurality of graphic files stored in a graphic files repository;
extracting monitored tags identifying function blocks of a field controller from the graphic files from the graphic files repository based on predefined rules for monitoring;
monitoring at least one real time data source for alarm status and data status changes relating to the monitored tags;
reading importance information and alarm priority information for the monitored tag from engineering information data source;
ranking each of the graphic views used in the graphic files for the monitored tags based on a total score determined from values for the tags related to each graphic view mapped in a graphic ranking table mapping different tag importance levels with different alarm priority levels corresponding to each of the tags related to each graphic view;
automatically identifying and displaying pre-configured views of prioritized thumbnails of the prioritized graphic views; and
periodically updating the pre-configured views of the thumbnails of the prioritized graphic views with real time data.

* * * * *

UNITED STATES PATENT AND TRADEMARK OFFICE
CERTIFICATE OF CORRECTION

PATENT NO. : 9,024,955 B2
APPLICATION NO. : 13/638229
DATED : May 5, 2015
INVENTOR(S) : Surendra Ramarao et al.

It is certified that error appears in the above-identified patent and that said Letters Patent is hereby corrected as shown below:

In the Claims

\*\* Column 11, Line 48 \*\*

Please delete the word "live"

Signed and Sealed this
Twentieth Day of October, 2015

Michelle K. Lee
*Director of the United States Patent and Trademark Office*